United States Patent
Stephens

(10) Patent No.: US 9,450,797 B2
(45) Date of Patent: Sep. 20, 2016

(54) MOBILE COMMUNICATIONS SYSTEM

(71) Applicant: SEPURA PLC, Cambridge (GB)

(72) Inventor: Peter Stephens, Cambridge (GB)

(73) Assignee: SEPURA PLC, Cambridge (GB)

( * ) Notice: Subject to any disclaimer, the term of this patent is extended or adjusted under 35 U.S.C. 154(b) by 0 days.

(21) Appl. No.: 14/767,288

(22) PCT Filed: Feb. 12, 2014

(86) PCT No.: PCT/GB2014/050398
§ 371 (c)(1),
(2) Date: Aug. 12, 2015

(87) PCT Pub. No.: WO2014/125264
PCT Pub. Date: Aug. 21, 2014

(65) Prior Publication Data
US 2016/0036607 A1 Feb. 4, 2016

(30) Foreign Application Priority Data

Feb. 12, 2013 (GB) .................... 1302414.6
Sep. 17, 2013 (GB) .................... 1316510.5

(51) Int. Cl.
*H04L 27/28* (2006.01)
*H04L 27/26* (2006.01)
*H04L 25/03* (2006.01)
*H04L 5/00* (2006.01)
(Continued)

(52) U.S. Cl.
CPC .......... *H04L 27/261* (2013.01); *H04L 5/0096* (2013.01); *H04L 25/03006* (2013.01); *H04L 27/2613* (2013.01); *H04L 27/2692* (2013.01); *H04W 56/00* (2013.01); *H04L 27/34* (2013.01); *H04L 2025/03783* (2013.01); *H04W 84/08* (2013.01)

(58) Field of Classification Search
USPC ....... 375/260, 262, 265, 285, 295–296, 316, 375/340, 342, 346–350
See application file for complete search history.

(56) References Cited

U.S. PATENT DOCUMENTS 6,014,375 A 1/2000 Janky
6,424,678 B1 7/2002 Doberstein
(Continued)

FOREIGN PATENT DOCUMENTS

EP 1168700 5/2007
GB 2407951 11/2005
(Continued)

OTHER PUBLICATIONS

PCT International Search Report and Written Opinion of the International Searching Authority, dated May 23, 2014, PCT/GB2014/050398.

(Continued)

*Primary Examiner* — Khanh C Tran
(74) *Attorney, Agent, or Firm* — Vierra Magen Marcus LLP

(57) ABSTRACT

A scheme for indicating the presence of stealing or other information in a digital mobile radio communications system. A sequence of pilot symbols and/or synchronization symbols that can be distinguished from a normal sequence of pilot symbols and/or synchronization symbols is included in a transmission to indicate the presence of stealing. A receiver determines whether a received transmission includes the stealing sequence or the normal sequence and decodes the transmission accordingly.

19 Claims, 5 Drawing Sheets

(51) Int. Cl.
*H04W 56/00* (2009.01)
*H04W 84/08* (2009.01)
*H04L 27/34* (2006.01)

(56) References Cited

U.S. PATENT DOCUMENTS

| | | | |
|---|---|---|---|
| 7,133,421 B1 | 11/2006 | Pekka | |
| 7,995,455 B1* | 8/2011 | Narasimhan | H04B 7/0447 370/208 |
| 2002/0002050 A1* | 1/2002 | Rinne | H04W 52/54 455/434 |
| 2002/0009101 A1* | 1/2002 | Niemela | H04W 16/06 370/523 |
| 2005/0195769 A1* | 9/2005 | Kaewell | H04B 7/2628 370/335 |
| 2012/0165060 A1* | 6/2012 | Klemettinen | H04Q 3/72 455/518 |
| 2012/0327871 A1* | 12/2012 | Ghosh | H04L 5/0023 370/329 |
| 2014/0194154 A1* | 7/2014 | Sridhara | H04L 25/0202 455/500 |

FOREIGN PATENT DOCUMENTS

| | | |
|---|---|---|
| GB | 2510718 | 8/2014 |
| WO | 2005/048551 | 5/2005 |
| WO | 2011066514 | 6/2011 |
| WO | 2014125265 | 8/2014 |

OTHER PUBLICATIONS

PCT Written Opinion of the International Preliminary Examining Authority, dated Feb. 3, 2015, PCT/GB2014/050398.
GB1402410.3 Combined Search and Examination Report dated May 27, 2014.
PCT International Search Report and Written Opinion of the International Searching Authority, dated May 8, 2014, PCT/GB2014/050399.
PCT International Preliminary Examination Report dated Jun. 12, 2015, PCT/GB2014/050399.
PCT Written Opinion of the International Preliminary Examining Authority dated May 8, 2015, PCT/GB2014/050399.
GB1402416.0 Combined Search and Examination Report dated Nov. 6, 2014.
Tse, et al., "Fundamentals of Wireless Communication; Chapter 3: Point-to-point communication: detection, diversity, and channel uncertainty", Dec. 31, 2005, pp. 49-119, XP055164655.
Nouri, "TEDS: A high speed digital mobile communication air interface for professional users," IEEE Vehicular Technology Magazine, IEEE, US, vol. 1, No. 4, Dec. 1, 2006.
"Terrestrial Trunked Radio (TETRA); Voice plus Data (V+D); Part 2: Air Interface (AI); 03206v343", ETSI Draft ; 03206V343, European Telecommunications Standards Institute France vol. TCCE No. V3.4.3, Aug. 10, 2011.
Navarro, et al., "Practical Non-Uniform Channelization for Multistandard Base Station", ZTE: communications, vol. 9, No. 4, Dec. 1, 2011, pp. 15-24, XP055164427.
Navalekar, "Distributed Digital Radios for Land Mobile Radio Applications," PhD dissertation—Worcester Polytechnic Institute, Dec. 22, 2009, pp. 1-116, XP055183648, https://www.wpi.edu/Pubs/ETD/Available/etd-010410-135413/unrestricted/navialekar.pdf.
System Proposal for a 6.25 kHz FDMA Radio Subsystem for V+D (TETRA 6), European Telecommunications Standards Institute, TETRA 6 version 0.0.1, Feb. 22, 1994.
"Electromagnetic compatibility and Radio spectrum Matters; Digital Mobile Radio (DMR) Systems; Part 1: DMR Air Interface (AI) protocol," ETSI TS 102 361-1 v1.4.5, Dec. 2007 http://www.etsi.org/deliver/etsi_ts/102300_102399/10236101/01.04.05_60/ts_10236101v010405p.pdf.
"Electromagnetic compatibility and Radio spectrum Matters (ERM); Peer-to-Peer Digital Private Mobile Radio using DFDMA with a channel spacing of 6,25 kHz with e.r.p. of up to 500 mW," ETSI TS 102 490 V1.3.1, Apr. 2007 http://www.etsi.org/deliver/etsi_ts/102400_102499/102490/01.03.01_60/ts_102490v010301p.pdf.
U.S. Appl. No. 14/767,289, filed Aug. 12, 2015, titled Mobile Communications System.

* cited by examiner

MOBILE COMMUNICATIONS SYSTEM

The present application is a Section 371 National Stage Application of International Application No. PCT/GB2014/050398, filed on 12 Feb. 2014, which claims the benefit of GB1316510.5, filed on 17 Sep. 2013 and GB1302414.6, filed on 12 Feb. 2013, the entire disclosure of which are incorporated herein by reference in their entirety.

The present invention relates to mobile communications systems, and in particular to digital mobile radio communications systems, such as the TETRA (TErrestrial TRunked RAdio) system.

Transmissions in mobile radio communications systems typically comprise a plurality of symbols. For example, transmissions in a multi-carrier system may comprise a plurality of symbols arranged on a time-frequency grid. The value of each symbol can be represented by a complex number. Various types of symbols are normally present, including for example, pilot symbols, data symbols and synchronisation symbols.

Conventionally, pilot symbols are included in transmissions to allow received signals to be corrected for the effects of distortion. Distortions may arise as transmissions pass through the propagation channel between a transmitter and a receiver. For example, in mobile communication systems the well known fading multipath distortion can arise, which may be represented as a time and frequency varying complex gain applied to each received symbol in the signal.

In these systems, pilot symbols with known amplitude and phase are typically inserted into the signal at the transmitter, and the receiver uses knowledge of the transmitted values to estimate the propagation channel distortion for each of the corresponding received symbols. Once the distortion is known at the receiver, a correction factor can be applied to remove it, and the whole signal can be demodulated successfully.

The use of pilot symbols for channel equalisation is well known and has been part of the TETRA2/TEDS standard since 2003. The properties of such symbols for equalisation purposes are also well known (see, for example, U.S. Pat. No. 6,424,678).

Equally, synchronisation symbols are typically included in transmissions to facilitate frame and symbol timing recovery at the receiver, i.e. to allow a receiver to determine the correct timing of bursts, as is known in the art.

Another feature of modern mobile communications systems, such as the TETRA system, is that they typically support a number of functionalities beyond and/or in addition to the basic transmission of (e.g.) voice data. These can include, for example, a stealing mechanism, Direct Mode Operation (DMO), and the like (as is known in the art).

Stealing is used to allow a communication system protocol to temporarily replace a block of one type of information (e.g. user data or voice data) with another type of information (e.g. protocol control information). It is typically done to allow "traffic" data blocks, (a traffic channel) to be used for signalling data (as a "control" channel). This is done dynamically and randomly at the transmitter, and the change must be indicated to a receiver so that it may demodulate the information correctly. Further details of stealing can be found, for example, in EN 300 392-2 sections 9.2.3.6 and 19.4.3.2.

A common method for indicating stealing (which method is used in conventional TETRA systems) is to have the transmitter flag stealing to a receiver using training sequences. Training sequences are short sequences of symbols whose primary purpose is to enable a receiver to determine burst timings. In the known method, a normal training sequence can be replaced by a different sequence to indicate stealing. The use of training sequences for indicating stealing is well known and has been part of the TETRA standard since the early 1990s (see, for example, EN 300 392-2).

It is becoming increasingly desirable in mobile communications systems to make more efficient use of the spectrum available for operation, since radio spectrum is a scarce resource. The Applicants believe therefore that there remains a need to be able to provide reduced bandwidth/ higher spectral efficiency digital mobile radio communications systems.

According to a first aspect of the present invention, there is provided a method of operating a digital mobile radio communications system in which pilot symbols are used for channel equalisation and in which synchronisation symbols are used to indicate burst timings, the method comprising:
using a sequence of pilot symbols and/or synchronisation symbols in a transmission to indicate to a receiver the presence of stealing in the transmission.

According to a second aspect of the present invention, there is provided a method of operating a digital mobile radio communications system in which pilot symbols are used for channel equalisation and in which synchronisation symbols are used to indicate burst timings, the method comprising:
determining whether a received transmission includes a sequence of pilot symbols and/or synchronisation symbols indicative of the presence of stealing in the transmission; and
if it is determined that a sequence of pilot symbols and/or synchronisation symbols indicative of the presence of stealing is present in the received transmission, identifying the presence of stealing in the transmission and decoding the transmission accordingly.

According to a third aspect of the present invention, there is provided a communications station for a digital mobile radio communications system in which pilot symbols are used for channel equalisation and in which synchronisation symbols are used to indicate burst timings, the communications station comprising:
a transmitter configured to include in a transmission a sequence of pilot symbols and/or synchronisation symbols to indicate to a receiver the presence of stealing in the transmission.

According to a fourth aspect of the present invention, there is provided a communications station for a digital mobile radio communications system in which pilot symbols are used for channel equalisation and in which synchronisation symbols are used to indicate burst timings, the communications station comprising:
a receiver configured to determine whether a received transmission includes a sequence of pilot symbols and/or synchronisation symbols indicative of the presence of stealing in the transmission, and to, if it is determined that a sequence of pilot symbols and/or synchronisation symbols indicative of the presence of stealing is present in the received transmission, identify the presence of stealing in the transmission and decode the transmission accordingly.

According to a fifth aspect of the present invention, there is provided a digital mobile radio communications system in which pilot symbols are used for channel equalisation and in which synchronisation symbols are used to indicate burst timings, the system comprising:

a transmitter configured to include in a transmission a sequence of pilot symbols and/or synchronisation symbols to indicate to a receiver the presence of stealing in the transmission.

According to a sixth aspect of the present invention, there is provided a digital mobile radio communications system in which pilot symbols are used for channel equalisation and in which synchronisation symbols are used to indicate burst timings, the system comprising:

a receiver configured to determine whether a received transmission includes a sequence of pilot symbols and/or synchronisation symbols indicative of the presence of stealing in the transmission, and to, if it is determined that a sequence of pilot symbols and/or synchronisation symbols indicative of the presence of stealing is present in the received transmission, identify the presence of stealing in the transmission and decode the transmission accordingly.

The present invention relates to a digital mobile communications system in which pilot symbols are transmitted for channel equalisation purposes and synchronisation symbols are transmitted to indicate burst timings. However, as well as the pilot symbols and/or synchronisation symbols being used for their conventional purposes, a particular sequence or sequences of pilot symbols and/or synchronisation symbols is also used to indicate channel stealing.

This then has the advantage that additional bits or symbols (and thereby channel bandwidth) over and above the (synchronisation, pilot and data) symbols already included in the transmission (burst), are not required in order to indicate the presence of stealing in the transmission. This thereby provides an efficient method of indicating stealing, that can accordingly reduce the radio bandwidth required for transmissions, thereby using available radio spectrum more efficiently (providing increased capacity).

For example, with respect to the TETRA system or TETRA-like systems (such as, for example, the Applicant's "Narrow Band Private Mobile Radio" (NB-PMR) system described in their earlier patent application GB 1302414.6), the present invention can avoid the need to use and/or provide training sequences for the purposes of indicating stealing. Indeed, in a preferred embodiment, the present invention does not use training sequences at all. In this way, the total bandwidth required for transmissions can be reduced and/or more of the available radio bandwidth can be used for the payload (data symbols) and/or other symbols (information).

Thus, the present invention can provide a higher capacity (more radio spectrum efficient) communications system, that can, e.g., operate in narrower frequency bands than existing systems.

In a preferred embodiment, stealing is indicated by the use of particular, selected pilot symbol and/or synchronisation symbol sequence or sequences in a transmitted burst, that have preferably (previously) been defined as indicating the presence of stealing. Thus, in a preferred embodiment of the present invention, the sequence of pilot symbols and/or synchronisation symbols that is used to indicate the presence of stealing is a particular, preferably selected, and preferably predefined, sequence of pilot symbols and/or synchronisation symbols.

The sequence of pilot symbols and/or synchronisation symbols may comprise any appropriate, preferably predefined, sequence of pilot symbols and/or synchronisation symbols. For example, the sequence may comprise a sequence of pilot symbols, a sequence of synchronisation symbols, or a combined sequence of pilot symbols and synchronisation symbols.

The sequence(s) of pilot symbols and/or synchronisation symbols used to indicate the presence of stealing (the stealing sequence(s)) are preferably distinct from and preferably (relatively easily) distinguishable from the "normal" (non-stealing) sequence(s) of pilot symbols and/or synchronisation symbols that are preferably included in transmissions when stealing is not required. This facilities the receiver indentifying the presence of stealing.

In a preferred embodiment, when stealing is required, the appropriate (stealing) pilot symbol and/or synchronisation symbol sequence is accordingly preferably inserted into a transmitted burst, preferably in place of the "normal" pilot symbol and/or synchronisation symbol sequence.

Similarly, the receiver is preferably arranged to determine (and to be capable of determining) whether a "normal" or "stealing" pilot symbol and/or synchronisation symbol sequence is present in a received burst, and to indicate that (to pass that) to the upper protocol layers as appropriate. The receiver is then able to decode the received burst appropriately. (As will be understood, the step of decoding the received transmission (burst) preferably comprises the steps of equalisation (i.e. estimating and removing channel distortion), demodulation (i.e. removing the modulation or converting the received symbols into data), and error-correction decoding.)

Preferably, the pilot symbols and/or synchronisation symbols of both the normal and stealing pilot symbol and/or synchronisation symbol sequences are placed at positions in each burst that have been previously defined. Similarly, the receiver is preferably arranged to have knowledge of this positioning. This facilitates the receiver determining which of the normal or stealing pilot symbol and/or synchronisation symbol sequences has been transmitted/received.

Most preferably, the normal and stealing indicating pilot symbol and/or synchronisation symbol sequences can be, and preferably are, used for channel equalisation and/or synchronisation in the normal manner, but are distinct from and can be (relatively easily) distinguished from one another. Thus, in a preferred embodiment, the system of the present invention uses pilot symbols and/or synchronisation symbol sequences that have multiple purposes, equalisation and/or synchronisation, and as a "stealing" (or non-stealing) indicator.

In a preferred embodiment, the stealing pilot symbol and/or synchronisation symbol sequence(s) are arranged to be orthogonal to the normal, non-stealing indicating, pilot symbol and/or synchronisation symbol sequence(s).

In these embodiments, any appropriate orthogonal sets of pilot symbols and/or synchronisation symbols/sequences may be used. However, in a particularly preferred embodiment, the stealing pilot symbol and/or synchronisation symbol sequence(s) are arranged to be distinguishable from the normal pilot symbol and/or synchronisation symbol sequence(s) prior to equalisation.

In this regard, as well as the normal impairments to transmissions such as noise and fading multipath distortion, frequency and timing offsets can be introduced to transmissions between the transmitter and receiver that can give rise to additional types of distortion to the pilot and/or synchronisation symbols. The Applicants have recognised that these distortions can mean that pilot symbols and/or synchronisation symbols (sequence(s)) that are orthogonal in a simple sense under nominal conditions may not be orthogonal when these distortions are taken into account.

For example, the complex channel attenuation can effectively convert a transmitted pilot symbol to any value, and indeed even to the same value as a stealing pilot symbol. Thus, in embodiments in which the receiver is arranged to attempt to detect which of the two types of symbol has been sent (i.e. which of a normal symbol or a stealing symbol has been sent) by comparing the received symbol with a list of known normal and stealing symbol values, it may determine incorrectly which symbol was sent.

Similar effects can be caused by frequency and timing offsets, which can introduce arbitrary phase changes to the received symbols (and thereby effectively convert a normal pilot or synchronisation symbol into a stealing symbol or vice versa).

The Applicants have furthermore recognised that the nature of the distortions (which include, for example, exponential terms, as will be discussed more fully below) means that a straightforward correlation may not normally exist between the received symbols and the known pilot and/or synchronisation symbols.

These problems are addressed in the preferred embodiment of the present invention by using stealing and normal (non-stealing) symbol sequences that can be distinguished from one another by the receiver prior to equalisation. In this way, the receiver is able to determine which symbol sequence has been transmitted before using the pilot symbols to carry out equalisation and demodulation, so that the receiver is able to use the correct symbol sequence for equalisation.

The receiver may be configured to determine which symbol sequence has been transmitted (before using the pilot and/or synchronisation symbols to carry out equalisation and demodulation) in any appropriate manner.

In a preferred embodiment this is achieved by using the phases of the symbols to distinguish between the stealing and normal (non-stealing) symbol sequences.

Thus, in a preferred embodiment, it is determined whether a stealing or normal (non-stealing) symbol sequence has been received (transmitted) by analysing the phases of the received symbols, with the symbol phases for the stealing and normal (non-stealing) stealing sequences being selected so as to facilitate such symbol phase analysis. Preferably the phases of the symbols in the received symbol sequence are analysed to generate a decision variable that can then be used to determine which of the two symbol sequences (normal or stealing) was transmitted.

In a particularly preferred embodiment, the receiver is configured to process the received signal in order to determine which (stealing or normal) symbol sequence has been transmitted/received, and then to carry out equalisation.

In a particularly preferred embodiment, when a symbol sequence for which it is to be determined whether it is a normal or stealing symbol sequence is received, the received symbol sequence is first "referenced" to a predetermined (nominal) reference normal symbol sequence, and, separately, to a predetermined (nominal) reference stealing symbol sequence, by removing the symbol phases for the respective reference symbol sequence from the received symbol sequence.

The phases of the reference symbols may be removed from the received pilot and/or synchronisation symbols in any suitable manner, but in a preferred embodiment this is done by multiplying each received symbol by the conjugate of its reference symbol value.

In this arrangement, the phases of the symbols of the received symbols once the reference symbol phases have been removed are preferably then analysed to determine whether a stealing or normal (non-stealing) symbol sequence has been transmitted.

This is preferably done by first combining pairs of symbols (with each symbol having had its reference symbol phase removed) in the received symbol sequences, preferably to derive pair-wise first order differences of the so-referenced received symbols. This helps to reduce and/or eliminate timing and/or frequency offsets.

For example, in embodiments that use multi-carrier transmission schemes, pairs of symbols (with their reference symbol phases removed), taken from the same multi-carrier symbol may be combined. In alternative embodiments that use a TEDS-like multi-carrier scheme having pilot symbols on several different subcarriers, pairs of symbols (more) closely spaced in frequency (preferably as close as possible) are used. These arrangements have the advantage of minimising the channel attenuation phase difference between the symbols of the pair.

In other embodiments that use single carrier schemes, neighbouring pairs of symbols along the time axis may be combined. In these embodiments, the resulting quantity will have a phase related to a frequency offset rather than a timing offset, which may be reduced by combining symbol pairs in a corresponding manner.

In a preferred embodiment, pairs of symbols are combined by multiplying a first symbol (with its reference symbol phase removed) with the conjugate of a second symbol (with its reference symbol phase removed), to derive the pair-wise first order differences of the so-referenced received symbols. The Applicants have recognised that the conjugate can be used in this manner to eliminate the timing and/or frequency offset between the transmitted symbols and the received symbols.

Preferably these pair-wise first order differences are then summed for some or all (and preferably for all) of the received symbol sequence symbol pairs to provide an integral of the pair-wise first order differences of the received symbols when referenced to the reference stealing symbol sequence, and an integral of the pair-wise first order differences of the received symbols when referenced to the reference normal (non-stealing) symbol sequence, which integral (sum) values can then be used, e.g. as decision variables, to decide whether a stealing or normal (non-stealing) symbol sequence has been received.

In this regard, the Applicants have recognised that the noise terms in this summation will tend towards zero provided that any differences in channel attenuation phase between adjacent pilot and/or synchronisation symbols are small. The Applicants have further recognised that this will generally be the case for pilot and/or synchronisation symbols in the same multi-carrier symbol, and/or where there is a small difference in frequency between the sub-carriers containing pilot and/or synchronisation symbols.

Thus, in a preferred embodiment, a first calculation is carried out in the manner described above using the reference symbols from the reference normal symbol sequence(s) to calculate a "normal symbol sequence" decision variable(s), and a second, corresponding calculation is preferably carried out using the reference symbols from the reference stealing symbol sequence(s) to calculate a "stealing symbol sequence" decision variable(s).

The normal and stealing symbol sequence decision variables are preferably then compared to determine which symbol sequence (set) was received (transmitted), preferably by comparing the magnitudes of the decision variables.

Preferably, the normal (non-stealing) and stealing-indicating symbol sequences are configured such that if the symbol sequence that the decision variable corresponds to has been received, then the value of the decision variable (of the integral) will be larger (e.g. maximised), but if the symbol sequence that the decision variable does not correspond to has been received, then the value of the decision variable (of the integral) will be smaller (e.g. minimised), or vice-versa, preferably by an appropriate choice of the pilot and/or synchronisation symbol phases (as will be discussed further below).

Then, in embodiments where the value of the decision variable is arranged to be maximised if the symbol sequence that the decision variable corresponds to has been received, then if the normal symbol sequence decision variable is larger than the stealing symbol sequence decision variable, the receiver may determine that the normal symbol sequence (set) was transmitted. Otherwise, it may determine that the stealing sequence (set) was transmitted (and vice-versa in the case where the value of the decision variable is arranged to be minimised if the symbol sequence that the decision variable corresponds to has been received).

Thus, according to a preferred embodiment, the step of determining whether a received transmission is indicative of stealing comprises: removing reference symbol phases from the received pilot and/or synchronisation symbols for each of the possible transmitted symbol sequences (sets); combining respective symbol pairs to reduce timing and/or frequency offsets; integrating the sets of resulting quantities to form decision variables; and comparing the decision variables to determine which symbol sequence (set) was transmitted.

As will be understood by those skilled in the art, this arrangement advantageously allows the stealing and normal symbol sequences to be distinguished from one another by the receiver prior to equalisation.

As discussed above, in a particularly preferred arrangement of these embodiments, the symbol phases for the stealing and normal (non-stealing) symbol sequences are selected so as to facilitate the above arrangement being able to distinguish between the stealing and normal (non-stealing) symbol sequences.

Thus, the symbol phases are preferably chosen so that one of: the integral of the pair-wise first order differences of the stealing symbol sequence after referencing with the reference normal (non-stealing) symbol sequence, and the integral of the pair-wise first order differences of the stealing symbol sequence after referencing with the reference stealing symbol sequence, will be a minimum, and the other integral will be a maximum (and correspondingly for the normal (non-stealing) symbol sequence).

Accordingly, in these embodiments if a stealing symbol sequence is received, the integral of the pair-wise first order differences of the received stealing symbol sequence after referencing with the reference stealing symbol sequence should be a maximum, but if the integral is calculated using the normal (non-stealing) reference symbol sequence, the integral should be a minimum (or vice-versa) (and correspondingly for the normal (non-stealing) symbol sequence).

Thus, where a stealing symbol sequence is received, the value of the integral calculated using the reference stealing symbol sequence should be greater than the value of the integral calculated using the reference normal (non-stealing) symbol sequence (or vice-versa), even in the presence of distortion (and correspondingly for the normal (non-stealing) symbol sequence).

(As discussed, the symbol phases may alternatively be chosen such that the above maximised values are instead minimised, and those values that are minimised are instead maximised.)

Thus, by using appropriate symbol phases, the orthogonality of the stealing indicating symbol sequence(s), and the normal, non-stealing indicating symbol sequence(s) can be effectively preserved, even in the presence of distortion.

Accordingly, the preferred method can advantageously be applied to signals which have not been equalised and where there is no knowledge of timing and frequency offsets between the transmitter and receiver. Accordingly, the effects of the propagation channel (distortion) on the signal, along with the effects of other system imperfections (such as frequency offsets), which would otherwise make it very difficult to determine which (normal or pilot) symbol sequence has been transmitted/received, can be addressed.

The communications station of the present invention may be a mobile station or a base station, as is known in the art. In one preferred embodiment it is a base station. In another preferred embodiment it is a mobile station.

Preferably, transmissions in the system use a multi-sub-carrier arrangement. Each channel may have any desired bandwidth, such as 12.5 kHz, 25 kHz, 50 kHz, 100 kHz or 150 kHz. The system may use only a single channel, but as will be appreciated by those skilled in the art, plural channels are preferably provided (supported) and used.

Each channel preferably contains plural sub-carriers. Any number of sub-carriers can be used, as will be appreciated by those skilled in the art. In a particularly preferred embodiment, four sub-carriers are used. In other embodiments, two, six, or eight sub-carriers can be used.

Each channel that is used in the present invention may be divided into the requisite multiple sub-carriers (sub-channels) in any desired and suitable manner. Most preferably, the sub-carriers (sub-channels) are equally spaced within the channel. For example, in embodiments using 12.5 kHz channels and four sub-carriers, a sub-carrier spacing of 2.7 kHz may be used.

In alternative embodiments, the system may use a single-carrier arrangement.

Each carrier or sub-carrier is preferably modulated with a modulation scheme that encodes one or more bits per symbol, and preferably at least 4 bits per symbol. The modulation scheme can be any desired and suitable modulation scheme. Suitable modulation schemes include QAM, PSK/DPSK, or OFDM schemes. Each carrier or sub-carrier should be and is preferably modulated using the same modulation scheme. In an embodiment, 16-QAM is used.

The present invention preferably uses particular (and identifiable) burst structures for its transmissions (as is conventional in mobile communications systems), so as to, e.g., allow particular forms (types) of transmissions to be readily identified and processed.

In general, the bursts preferably include pilot symbols spaced to facilitate equalisation at the receiver, synchronisation symbols to facilitate frame and symbol timing recovery at the receiver, and data symbols for carrying the useful payload (and any required header). In multi-carrier embodiments, the symbols are preferably ordered regularly across and along the time and frequency axes of each burst.

In an embodiment, the pilot symbols are placed along the time and frequency axes of the bursts at approximately regular intervals. This then allows for the correction factors used in channel equalisation to be determined in each dimension. This is particularly useful in a multi-carrier system, in which each symbol can experience a different distortion, so that correction factors are needed for each symbol in the time-frequency grid. In an alternative embodiment, the pilot symbols are placed along the time and frequency axes of the bursts at irregular intervals.

In an embodiment, the arrangement and spacing of the pilot symbols is not fixed, and in an embodiment may be altered dynamically. In these embodiments, the transmitter and receiver are arranged to be able to communicate any change in the arrangement of pilot symbols. This then may be used, for example, to provide more pilot symbols to enable better equalisation when desired, for example in rapidly fading conditions.

In a preferred embodiment, pilot symbols are included (used) in the outer sub-carriers in the channel only (so in the outer two, but not the inner two, sub-carriers where four sub-carriers are being used). This helps to provide more symbols for data purposes.

In a preferred embodiment, synchronisation symbols are included (used) in all sub-carriers in the channel at the beginning of a burst. This helps to facilitate synchronisation.

In a preferred embodiment, the methods and apparatus of the present invention are used in a system that uses a four slot time-division multiple access scheme in 12.5 kHz channels, with each 12.5 kHz channel containing plural sub-carriers and each sub-carrier being modulated with a modulation scheme that encodes at least 4 bits per symbol, for transmission in the system.

Thus, in an embodiment, the method further comprises:
using a four slot time-division multiple access scheme in 12.5 kHz channels, with each 12.5 kHz channel containing plural sub-carriers and each sub-carrier being modulated with a modulation scheme that encodes at least 4 bits per symbol, for transmission in the system.

In an embodiment, the communications station further comprises:
means for making transmissions using a four slot time-division multiple access scheme in 12.5 kHz channels, with each 12.5 kHz channel containing plural sub-carriers and each sub-carrier being modulated with a modulation scheme that encodes at least 4 bits per symbol.

In an embodiment, the digital mobile radio communications system further comprises:
means for making transmissions using a four slot time-division multiple access scheme in 12.5 kHz channels, with each 12.5 kHz channel containing plural sub-carriers and each sub-carrier being modulated with a modulation scheme that encodes at least 4 bits per symbol.

The Applicants have furthermore recognised that the techniques of the present invention may be used to convey (transmit) other types of information between a transmitter and a receiver (e.g. information not necessarily related to stealing). In this regard, the Applicants have recognised that the techniques of the present invention essentially convey one (or more) additional bits of information (i.e. not stealing/stealing) using particular sequences of pilot symbols and/or synchronisation symbols. This information may be used for purposes other than stealing, for example to indicate different modulation levels or types (e.g. 4-QAM, 64-QAM, etc.) for the payload in the slot, to indicate different types of coding for the slot contents, to indicate different transmission bandwidths, etc.

Thus, in embodiments, additional (e.g. third and/or fourth and/or fifth (and so on)) symbol sequences (sets) are preferably defined and used to convey additional information.

Correspondingly, according to a further aspect of the present invention, there is provided a method of operating a digital mobile radio communications system in which pilot symbols are used for channel equalisation and in which synchronisation symbols are used to indicate burst timings, the method comprising:
including in a transmission a sequence of pilot symbols and/or synchronisation symbols to indicate to a receiver additional information in the transmission.

According to another aspect of the present invention, there is provided a method of operating a digital mobile radio communications system in which pilot symbols are used for channel equalisation and in which synchronisation symbols are used to indicate burst timings, the method comprising:
determining whether a received transmission includes a sequence of pilot symbols and/or synchronisation symbols indicative of additional information in the transmission; and
if it is determined that a sequence of pilot symbols and/or synchronisation symbols indicative of additional information is present in the received transmission, identifying the additional information in the transmission.

According to another aspect of the present invention, there is provided a communications station for a digital mobile radio communications system in which pilot symbols are used for channel equalisation and in which synchronisation symbols are used to indicate burst timings, the communications station comprising:
a transmitter configured to include in a transmission a sequence of pilot symbols and/or synchronisation symbols to indicate to a receiver additional information in the transmission.

According to another aspect of the present invention, there is provided a communications station for a digital mobile radio communications system in which pilot symbols are used for channel equalisation and in which synchronisation symbols are used to indicate burst timings, the communications station comprising:
a receiver configured to determine whether a received transmission includes a sequence of pilot symbols and/or synchronisation symbols indicative of additional information in the transmission, and to, if it is determined that a sequence of pilot symbols and/or synchronisation symbols indicative of additional information is present in the received transmission indentify the additional information in the transmission.

According to another aspect of the present invention, there is provided a digital mobile radio communications system in which pilot symbols are used for channel equalisation and in which synchronisation symbols are used to indicate burst timings, the system comprising:
a transmitter configured to include in a transmission a sequence of pilot symbols and/or synchronisation symbols to indicate to a receiver additional information in the transmission.

According to another aspect of the present invention, there is provided a digital mobile radio communications system in which pilot symbols are used for channel equalisation and in which synchronisation symbols are used to indicate burst timings, the system comprising:
a receiver configured to determine whether a received transmission includes a sequence of pilot symbols and/or synchronisation symbols indicative of additional information in the transmission, and to, if it is determined that a sequence of pilot symbols and/or synchronisation symbols indicative of additional information is present in the received transmissions, identify the additional information in the transmission.

As will be appreciated by those skilled in the art, these embodiments and aspects of the present invention can and preferably do include any one or more or all of the preferred and optional features of the invention described herein, as appropriate.

The additional information may comprise any suitable and desired additional information, over and above the information encoded by the symbols in the burst. The additional information preferably relates to (and is about) the transmission. In various embodiments, the additional information may indicate, for example, stealing, modulation levels or types (e.g. 4-QAM, 64-QAM, etc.), types of coding, or a transmission bandwidth. Other uses for the additional information will occur to the skilled person.

The methods in accordance with the present invention may be implemented at least partially using software e.g. computer programs. It will thus be seen that when viewed from further aspects the present invention provides computer software specifically adapted to carry out the methods hereinabove described when installed on data processing means, and a computer program element comprising computer software code portions for performing the methods hereinabove described when the program element is run on data processing means. The invention also extends to a computer software carrier comprising such software which when used to operate a communications system and a communications station comprising data processing means causes in conjunction with said data processing means said system or station to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out hereinabove.

A number of preferred embodiments of the present invention will now be described by way of example only and with reference to the accompanying drawings, in which.

A preferred embodiment of the present invention will now be described with particular reference to a narrow band TETRA-compatible mobile communications system in which 12.5 kHz channels are used for transmission. However, as will be appreciated, the present invention is not exclusively limited to such an arrangement and will be applicable to other radio Standards and systems, including for example other multi-carrier systems such as the TEDS system.

For convenience, the narrow band communication scheme of the present embodiment will be referred to as NB-PMR.

Figure 1:
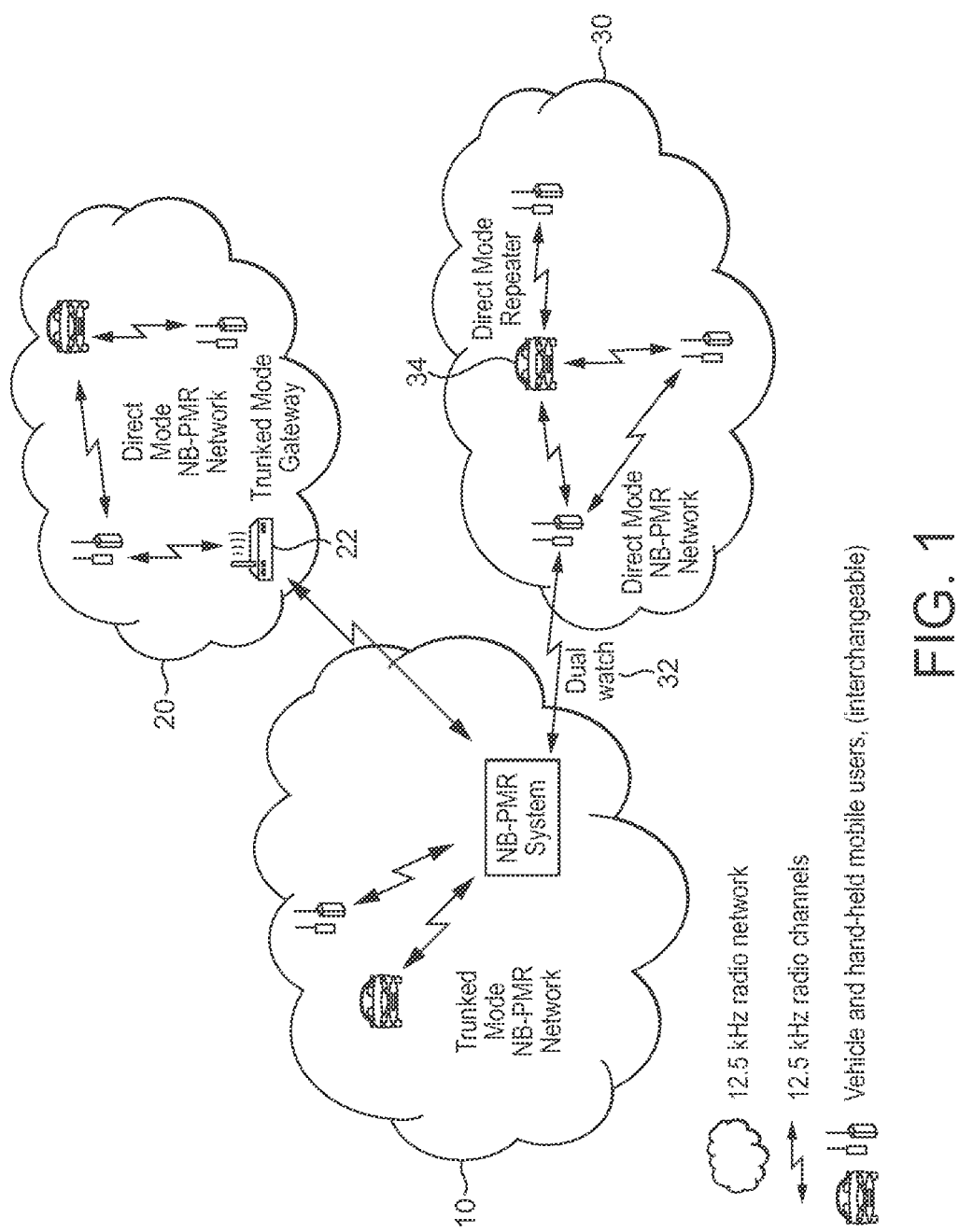
FIG. 1 shows a schematic diagram of an exemplary hybrid mobile communications system in accordance with an embodiment of the present invention.

FIG. 1 shows a schematic diagram of an exemplary narrow band Private Mobile Radio (NB-PMR) TETRA-compatible mobile communications system in which 12.5 kHz channels are used for transmission in accordance with this preferred embodiment of the present invention. In FIG. 1, the arrowed lines indicate 12.5 kHz channels. Also shown are vehicle and hand-held communications terminals (which are interchangeable). The system includes one or more base stations and infrastructure elements which form a 12.5 kHz trunked mode network 10, as is conventional in mobile communications systems.

FIG. 1 also shows Direct Mode Operation, with 12.5 kHz direct mode networks 20, 30 which allow communications terminals to operate in direct mode with each other, and to communicate with the trunked mode network 10 via a trunked mode gateway 22 and/or a dual watch mobile station 32. One or more direct mode repeaters 34 may be provided in the system to extend the range of communication between communications terminals operating in direct mode.

Figure 2:
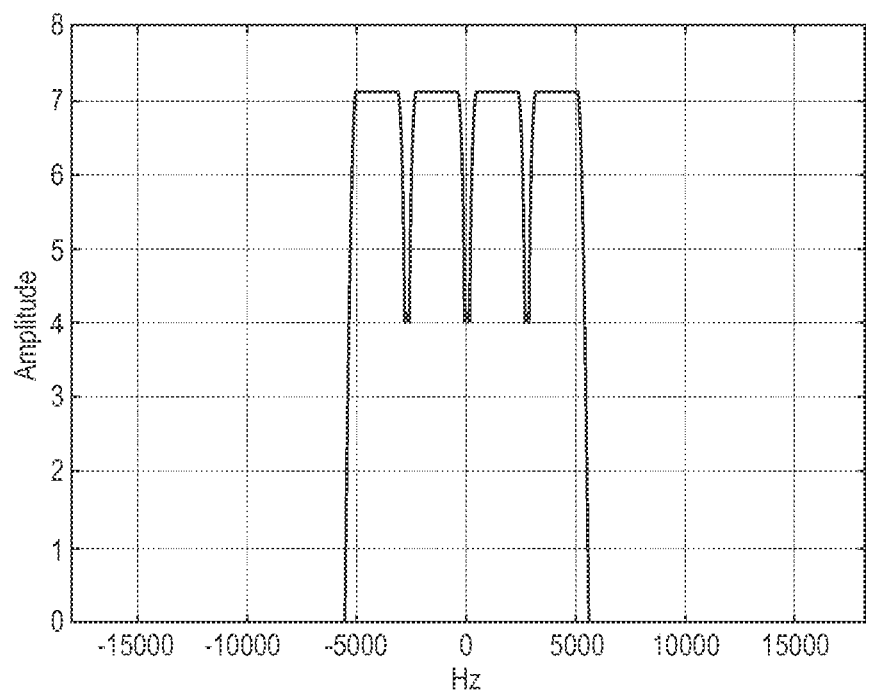
FIG. 2 shows an exemplary spectrum of a single 12.5 kHz channel for a preferred embodiment of a narrow band mobile communications system in accordance with the present invention.

FIG. 2 shows an exemplary spectrum of a single 12.5 kHz channel that is used in this embodiment of the present invention. While FIG. 2 illustrates a spectrum for one such channel, it will be appreciated that in practice preferably plural 12.5 kHz channels are provided (supported) and used.

According to this embodiment, and as shown in FIG. 2, each 12.5 kHz channel carries (is divided into) four equally spaced sub-carriers, having a spacing of 2.7 kHz. The modulation scheme uses 2400 symbols per second, and an RRC modulation filter with alpha=0.2. Accordingly, the nominal overall modulation bandwidth provided within the 12.5 kHz channel is 10.8 kHz.

Figure 3:
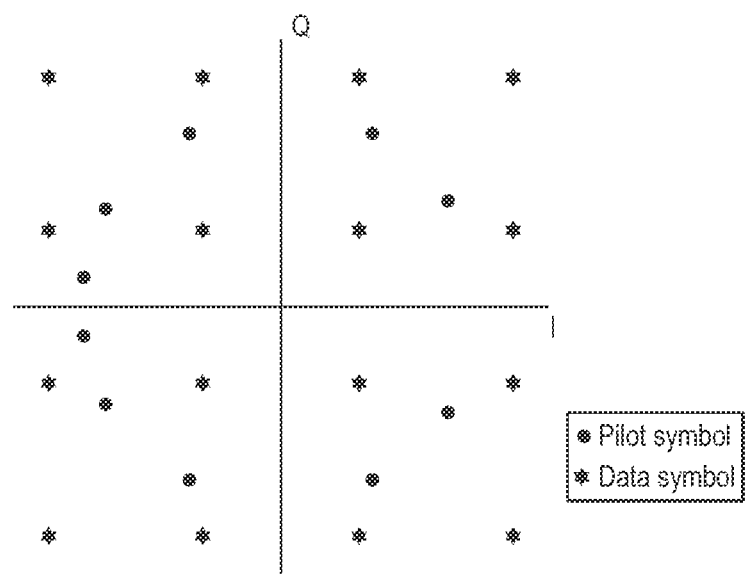
FIG. 3 shows the symbol constellation diagram for a modulation scheme in accordance with a preferred embodiment of the present invention.

A 16-QAM modulation scheme is used to modulate the symbols on each respective sub-carrier in the 12.5 kHz channel. FIG. 3 shows the symbol constellation diagram for the 16-QAM modulation scheme which is used in this embodiment of the present invention. Circles represent pilot symbols and stars represent data symbols. This modulation scheme encodes 4-bits per-symbol. Other modulation schemes could be used, if desired.

Figures 4, 5:
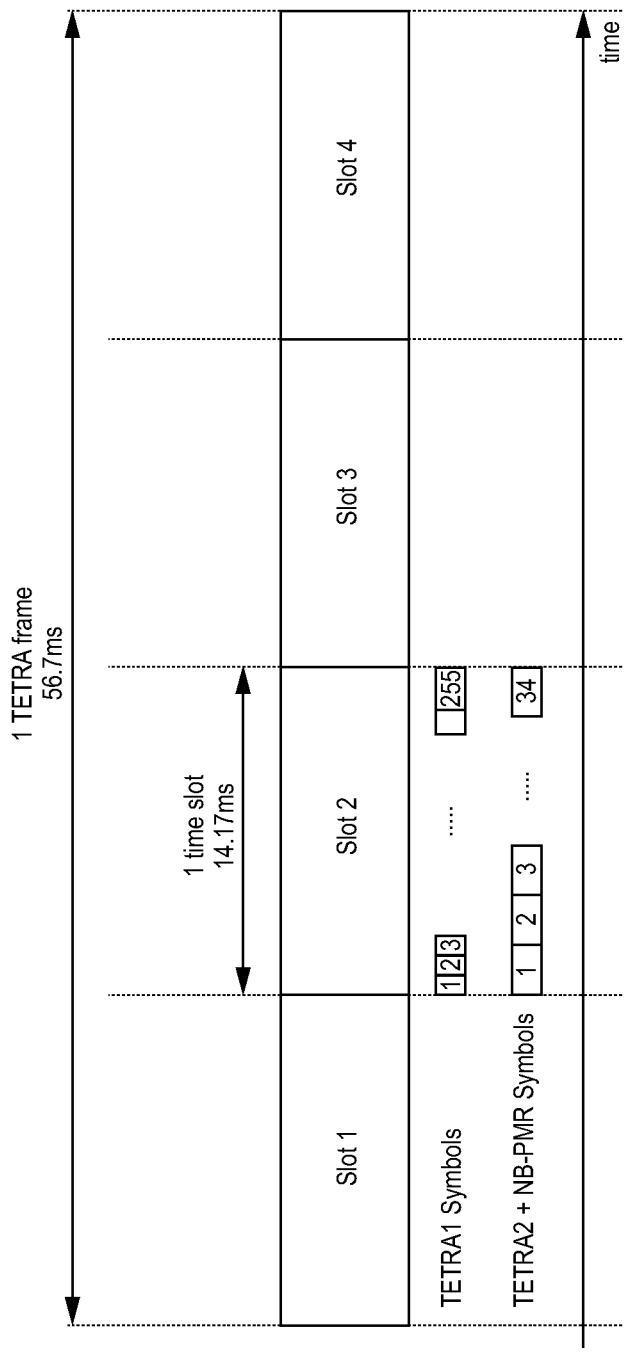
FIG. 4 illustrates the structure of a frame for use in a preferred embodiment of the present invention.
FIG. 5 shows an embodiment of the normal uplink burst structure to be used in preferred embodiments of the present invention.

FIG. 4 illustrates the timeslot and frame structure that is used in this preferred embodiment of the present invention. A four-slot TDMA arrangement, having the timing structure of TETRA 1 is used. Thus, each frame has four timeslots (shown as Slots 1 to 4), each time-slot is 14.17 ms long, and each frame is 56.7 ms long. Also, as shown in FIG. 4, the arrangement is such that each timeslot contains 34 (NB-PMR) symbols per-sub-carrier. This facilitates compatibility with TETRA 1 systems whose time slot and frame structure is also shown in FIG. 4 for comparison purposes.

In this arrangement, using the 16-QAM modulation scheme in a timeslot having the TETRA 1 timing structure and containing 34 symbols per sub-carrier, provides 4×34=136 bits per sub-carrier per timeslot, and so can be used to provide 544 bits (4×136) per timeslot where 4 sub-carriers (each carrying 34 16-QAM symbols) are being used. This bit capacity can be used to provide a system that is compatible with TETRA 1.

As well as the above modulation scheme and sub-carrier arrangement, etc., the present embodiment also uses particular burst structures for its transmissions when operating in the 12.5 kHz channels. FIG. 5 shows an example of a burst structure that is used in the present embodiment, namely the normal uplink burst structure.

In FIG. 5, the various symbols depicted comprise data symbols (labelled D) (from the 16-QAM symbol constellation), pilot symbols (labelled P) (from a pilot symbol constellation), and synchronisation symbols (labelled S) (from a synchronisation symbol constellation).

This burst structure is designed to allow the four sub-carrier modulation scheme having the symbol duration and slot duration described above (i.e. providing a total of 136 (4×34) symbols per timeslot) (and thus 544 bits per timeslot) (with four bits per symbol) of the present embodiment to provide sufficient capacity to support TETRA 1 compatible payloads, whilst still allocating a number of symbols in each slot as synchronisation symbols and as pilot symbols in order to support synchronisation and channel equalisation, etc.

Thus, the burst structures of this embodiment can be used to achieve payload capacities that are sufficient for compatibility with TETRA 1. Other burst structures would be possible, if desired.

As discussed above, pilot symbols are included in burst structures to allow received signals to be corrected for the effects of distortion. The pilot symbol values can be represented as a complex number, and can in principle take any value. In the present embodiment, the values of the pilot symbols are similar to values of the data symbols. FIG. 5 shows an example of pilot symbol and data symbol values using a 16-QAM modulation scheme.

In the present embodiment, pilot symbols are placed on the outer two of the four subcarriers and at time intervals of a few symbols. For example, in the normal uplink burst depicted in FIG. 3 there are ten pilot symbols, with five on each subcarrier. In this embodiment, the pilot-carrying subcarrier frequency offset with respect to the centre of the channel is $\pm f_c$.

Figure 6A:
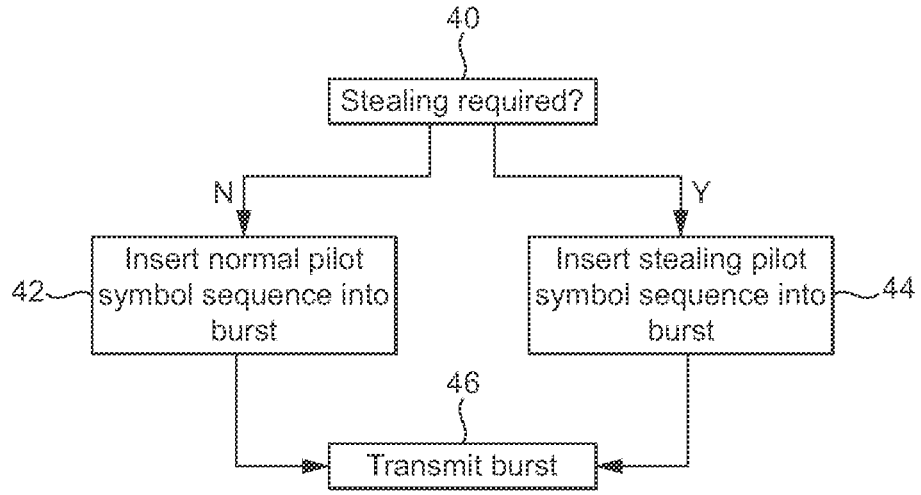
FIG. 6 shows a flow diagram illustrating a stealing process according to an embodiment of the present invention.

As discussed above, in the present embodiment, when stealing is required, the transmitter includes in a transmission a sequence of pilot symbols indicative of stealing, in place of the "normal" sequence of pilot symbols. This process is illustrated by FIG. 6A. In step 40, it is determined whether stealing is required. If stealing is not required, the normal pilot symbol sequence is inserted into the burst in step 42, and the burst is then transmitted in step 46. If, on the other hand, stealing is required in step 40, the stealing pilot symbol sequence is inserted into the burst in step 44, and the burst is transmitted in step 46, in a corresponding manner. In embodiments where synchronisation symbols are additionally or instead used to indicate stealing, stealing or normal synchronisation symbols are inserted into the burst in a corresponding manner.

Figure 6B:
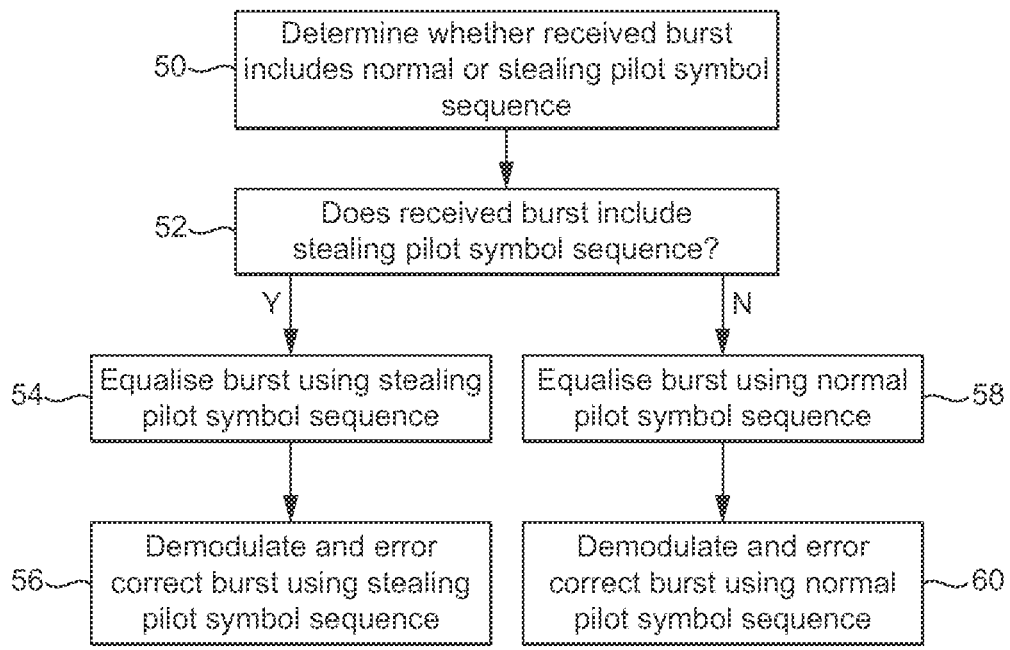

The receiver is then able to determine whether the received transmission includes a sequence of symbols indicative of the presence of stealing (or not) (or a "normal" sequence of symbols), and if this is the case, to identify the presence of stealing in the transmission and to decode the transmission accordingly. This is illustrated by FIG. 6B. In the present embodiment, decoding the received transmission (burst) comprises steps of equalisation (i.e. estimating and removing channel distortion), demodulation (i.e. removing the modulation or converting the received symbols into data), and error-correction decoding. Accordingly, in step 50, it is determined whether the received burst includes the normal symbol sequence or the stealing symbol sequence. If it is determined in step 52 that the burst includes the stealing symbol sequence, then the burst is equalised using the stealing pilot symbols in step 54, and is decoded (demodulated and error corrected) in step 56. If, on the other hand, the received burst does not include the stealing symbol sequence (i.e. instead includes the normal symbol sequence), then the burst is equalised using the normal pilot symbols in step 58, and is then decoded (demodulated and error corrected) in step 60. (Again, where synchronisation symbols are used to indicate stealing, the reception process will operate in a corresponding manner.)

As discussed above, transmissions between a transmitter and a receiver can be distorted due to effects of the transmissions passing through the propagation channel between the transmitter and the receiver (this distortion can be represented as a time and frequency varying complex gain applied to each received symbol in the signal). These problems are addressed in the present embodiment by using stealing and normal (non-stealing) symbol sequences that can be distinguished from one another by the receiver prior to equalisation. In the present embodiment, this is achieved by an appropriate choice of the stealing pilot symbol and/or synchronisation symbol phases.

The receiver is configured to determine which symbol sequence has been transmitted (before using the pilot and/or synchronisation symbols to carry out equalisation and demodulation) by processing the received signal in order to determine which (stealing or normal) symbol sequence has been transmitted/received, and then to carry out equalisation. The manner of the processing used in the present embodiment to determine which (stealing or normal) symbol sequence has been transmitted/received will now be discussed.

In the present embodiment, a sequence (set) of k pilots $r=(r_1 r_2 r_3 \ldots r_k)$ is transmitted by the transmitter and subsequently received at the receiver as $p=(p_1 p_2 p_3 \ldots p_k)$, after passing through a propagation channel. A received pilot symbol $p_i$ arriving at time t in the receiver will be of the form:

$$p_i = \alpha_i r_i \cdot e^{2\pi i f_c dt} \cdot e^{2\pi i f_0 t} + n_i \qquad (1)$$

in the non-stealing case. In equation (1), $\alpha_i = (A_i, \psi_i)$ is the channel attenuation at symbol i; $r_i = (R_i, \theta_i)$ is the ith transmitted pilot symbol of the pilot symbols in a burst; $e^{2\pi i f_c dt}$ is a phase rotation due to the timing offset dt between the receiver and the transmitter (in a perfectly synchronised receiver this would be zero, but in practical systems this is non-zero); $e^{2\pi i f_0 t}$ is a phase rotation due to a frequency offset $f_0$ between the receiver and the transmitter (in a perfectly frequency-locked receiver, this would be zero, but in practical systems it is non-zero); and $n_i = (N_i, \Xi_i)$, is a noise term at symbol i.

As discussed above, in conventional communications systems, pilot symbols are used to remove the channel distortion, $\alpha_i$ using the known values of the pilot symbols. However, in the present embodiment, this is not done until it has been determined which of the two (normal or stealing) symbol sequences (sets) has been transmitted. In other words, a stealing detection step is carried out by the receiver prior to channel equalisation, so that the receiver can use the correct symbol sequence for equalisation. Accordingly, $\alpha_i$ is unknown when the transmission is received by the receiver.

Similarly, frequency and timing errors may be present in the received transmission, and a real-life receiver will not normally be able to fully correct them, so that the exponential terms in equation (1) will also be unknown when the transmission is received by the receiver. In the present embodiment, the presence of the unknown factor $\alpha_i$ and the unknown exponential terms prohibits a straightforward application of correlation between the received symbol sequence (set) and the known normal and stealing pilot symbol sequences (sets) for detecting stealing.

In the present embodiment a decision variable is defined which is used to minimise or eliminate the unknown terms in equation (1). The magnitude of the decision variable is used by the receiver to determine which of the two symbol sequences (sets) (normal or stealing) was transmitted.

In this embodiment, the reference symbol phases (reference to a "reference symbol" herein refers to the nominal value of a normal or stealing symbol in the absence of distortion or other system imperfections) are firstly removed from the received pilot symbols by multiplying each received symbol by the conjugate of its reference value:

$$q_i = p_i r_i^*$$
$$= (\alpha_i r_i \cdot e^{2\pi i f_c dt} \cdot e^{2\pi i f_0 t} + n_i) \cdot r_i^*$$
$$= \alpha_i \cdot e^{2\pi i f_c dt} \cdot e^{2\pi i f_0 t} + n_i r_i^*.$$

Here, the reference pilot amplitudes have been assigned a value of unity. $q_i$ are referred to as the pilot symbol referenced received symbols.

Next, pairs of pilot symbols (with their reference symbol phases removed), taken from the same multi-carrier symbol are combined:

$$d_j = q_i q_{i-1}^* \quad (2)$$
$$= (\alpha_i \cdot e^{2\pi i f_c dt} \cdot e^{2\pi i f_0 t} + n_i r_i^*)(\alpha_{i-1} \cdot e^{-2\pi i f_c dt} \cdot e^{2\pi i f_0 t} + n_{i-1} r_{i-1}^*)^*$$
$$= (\alpha_i \alpha_{i-1}^* \cdot e^{4\pi i f_c dt} + \text{noise terms})$$

for i=2, 4, ... $n_p$, where $n_p$ is the number of pilot symbols and j=i/2. $d_j$ are referred to as the pair-wise first order differences of the pilot symbol referenced symbols.

In polar notation (R, θ), equation (2) can be re-written as:

$$d_j = q_i q_{i-1}^* = (A_i A_{i-1}, 4\pi f_c dt + \psi_i - \psi_{i-1}) + \text{noise terms}$$

The use of the conjugate $q^*_{i-1}$ eliminates the frequency offset term between the transmitter and the receiver. The remaining exponential term is the same for all pairs of pilot symbols combined in this way, for a burst with a time offset dt. $d_j$ is a complex vector of variable size, which depends on the channel attenuation, and has a phase related to the timing error plus the channel attenuation phase difference at time t.

The noise terms are:

$$n_i r_i^* \alpha_{i-1}^* \cdot e^{2\pi i f_c dt} \cdot e^{-2\pi i f_0 t} + n_{i-1}^* r_{i-1} \alpha_i \cdot e^{2\pi i f_c dt} \cdot e^{2\pi i f_0 t} + n_i r_i^* n_{i-1}^* r_{i-1}. \quad (3)$$

In the present embodiment, a decision variable is defined as:

$$V_p = \sum_{j=1}^{n_p/2} d_j$$

The decision variable $V_p$ is the integral of the pair-wise first order differences of the pilot symbol referenced received symbols.

In this summation the noise terms will tend to integrate towards zero, whereas the $\alpha_i \alpha^*_{i-1} \cdot e^{4\pi i f_c dt}$ term will integrate along the direction of the timing offset phase term. This holds true provided that the differences in the channel attenuation phase between pilots i and i−1 are small, which will generally be the case for pilots in the same multi-carrier symbol (i.e. multi-carrier symbols 1-31 defined in FIG. 4), and where there is a small difference in frequency between the subcarriers containing the pilot symbols.

In the present embodiment, next, a similar analysis as above is carried out with respect to the stealing pilot symbol sequence (set) $s_i=(S_i,\phi_i)$. The analysis is similar, except that the stealing symbol phases are removed in the first step:

$$q_i = p_i s_i^*$$
$$= (\alpha_i r_i \cdot e^{2\pi i f_c dt} \cdot e^{2\pi i f_0 t} + n_i) \cdot s_i^*$$
$$= \alpha_i r_i s_i^* \cdot e^{2\pi i f_c dt} \cdot e^{2\pi i f_0 t} + n_i s_i^*$$

or in polar (R, θ) notation:

$$q_i = (A_i R_i S_i, \psi_i + \theta_i - \phi_i + 2\pi i f_c dt + 2\pi i f_0 dt) + (N_i S_i, \Xi_i - \phi_i).$$

$q_i$ are referred to as the stealing pilot symbol referenced received symbols.

Pairs of pilot symbols are then combined:

$$e_j = q_i q^*_{i-1} = (A_i A_{i-1}, \theta_i - \phi_i - \theta_{i-1} + \phi_{i-1} + \psi_i - \psi_{i-1} + 4\pi i f_c dt) + \text{noise terms} \quad (4)$$

for i=2, 4, ... $n_p$, and j=i/2, where a value of unity is assigned to the reference symbol amplitudes. The noise terms in this case are:

$$(A_i R_i S_i N_{i-1} S_{i-1}, \psi_i + \theta_i - \phi_i + 2\pi i f_c dt + 2\pi i f_0 dt - \Xi_{i-1} + \phi_{i-1}) +$$
$$(A_{i-1} R_{i-1} S_{i-1} N_i S_i, -\psi_{i-1} - \theta_{i-1} + \phi_{i-1} - 2\pi i f_c dt - 2\pi i f_0 dt +$$
$$\Xi_i - \phi_i) + (N_i N_{i-1} S_i S_{i-1}, \Xi_i - \phi_i - \Xi_{i-1} + \phi_{i-1})$$

or with unity reference amplitudes:

$$(A_i N_{i-1}, \psi_i + \theta_i - \phi_i + 2\pi i f_c dt + 2\pi i f_0 dt - \Xi_{i-1} + \phi_{i-1}) + (A_{i-1} N_i, -\psi_{i-1} - \theta_{i-1} + \phi_{i-1} - 2\pi i f_c dt - 2\pi i f_0 dt + \Xi_i - \phi_i) + (N_i N_{i-1}, \Xi_i - \phi_i - \Xi_{i-1} + \phi_{i-1})$$

This should again integrate towards zero in the decision variable summation.

As will be appreciated, equation (4) is essentially the same as equation (2) with the exception that there are additional phase difference terms $\theta_i - \phi_i$ present. These are the phase differences between the stealing pilot symbols and the normal pilot symbols. The $e_j$ are a set of complex vectors, each with a component along the direction of the timing offset, and a component along the direction of the composite phase difference between pilot and stealing pilot symbols (i.e. the $\theta_i - \phi_i, \theta_{i-1} + \phi_{i-1}$ term, ignoring the channel phase difference for pilot symbols in the same multi-carrier symbol).

In the present embodiment, the decision variable formed from the correlation of the received pilot symbols with the stealing pilot reference symbols is defined as:

$$U_p = \sum_{j=1}^{n_p/2} e_j.$$

The decision variable $U_p$ is the integral of the pair-wise first order differences of the stealing pilot symbol referenced received symbols.

In the present embodiment, this value is arranged to be zero (or at least minimised) by an appropriate choice of the stealing pilot symbol phases. These are accordingly chosen such that:

$$\sum_{j=1}^{n_p/2} \varepsilon_j = 0, 2\pi, 4\pi, \text{etc.,} \quad (5)$$

where $\epsilon_j$ is the composite phase $\theta_i - \phi_i - \theta_{i-1} + \phi_{i-1}$ for the jth pair of symbols. That is, the integral of the pair-wise first order difference of the stealing pilot symbol referenced received symbols is minimised.

In the present embodiment, the magnitude of the decision variable is used by the receiver to determine which of the two symbol sequences (sets) (normal or stealing) was transmitted, i.e. if $|V_p| \geq |U_p|$, the receiver determines that the normal pilot symbol sequence (set) was transmitted, otherwise it determines the stealing sequence (set) was transmitted.

As an example, consider a sequence (set) of 10 pilot symbols in a NB-PMR burst:

-0.763925-0.645272i,0.997449+0.071229i,-
      0.995496+0.094606i,-0.240542+0.970593i,
      0.996472-0.083924i,0.654915+0.755685i,-
      0.458868-0.888500i,-0.315861-0.948803i,
      0.645272-0.763925i,0.071229-0.997449i

In order to satisfy equation (5), a phase for pilot pair j is set as:

$a = 2\pi j/5$ for j=1, 2 . . . 5. Then $\phi$ is chosen such that $\theta_i - \phi_i = a/2$ and $\theta_{i-1} - \phi_{i-1} = -a/2$. The composite phase for this and each pair is a and the sum in equation (5) is:

$$\frac{2\pi}{5} \cdot \sum_{j=1}^{5} j = 6\pi.$$

The stealing pilot sequence (set) is then:

-0.238744-0.971045i,-0.848808+0.528652i,
      0.217646-0.975993i,-0.997464+0.071178i,-
      0.996457+0.083923i,0.654905+0.755674i,-
      0.703205+0.710960i,-0.999957+0.007205i,
      0.073011-0.997295i,-0.643901+0.765074i

As will be appreciated, an alternative sequence (set) of stealing pilots may be chosen using:

$$a = 2 \cdot \frac{2\pi j}{5}, \text{etc.,}$$

or in general, where there are $n_p$ pairs of pilot symbols, the value a may be chosen as:

$a = k \cdot 2\pi/n_p$, where k is an integer.

It should be noted that other phase values satisfying equation (5) can be chosen, since it is not necessary to constrain the composite phase, $\epsilon_j$, for each pair, as long as the sum of the composite phases satisfies equation (5).

Hence systems that deploy the pilot symbol design of the present invention may use normal, stealing and additional alternate symbol sequences (sets) to convey additional small amounts of information between the transmitter and the receiver, without additional payload capacity being used up.

The embodiment above is described in relation to the NB-PMR. However the methods of the present invention are applicable to other radio Standards and systems. In these embodiment, the basic receiver steps remain the same. Firstly, the reference symbol phases are removed for each of the possible symbol sequences (sets). Secondly, timing and/or frequency offsets are reduced by combining symbol pairs. The sets of resulting quantities are then integrated to form a decision variable. Finally, a comparison is made between the values of the resulting decision variables to determine which symbol sequence (set) was transmitted.

As will be appreciated, or other multi- or single-carrier systems, the second step may require different mathematical steps. For example, in embodiments using a single carrier scheme, it is not possible to combine pairs of symbols taken from the same multi-carrier symbol, as there is only one symbol present at any given time. In these embodiments, neighbouring pairs of symbols along the time axis are instead used, and the resulting phase term contains a phase related to frequency offset rather than timing offset.

In these embodiments, the subcarrier frequency offset $f_c$ is effectively zero, so that the terms including $f_c$ disappear. As will be appreciated, the frequency offset term does not then cancel out when the difference operation between pairs of symbols along the time axis is performed, but instead becomes the phase angle of the pilot referenced difference vectors. So the difference operation is in effect used to stabilize the phase of the complex variable used in the decision variable integration (i.e. the $d_j$) and could be applied to symbol pairs along the time axis and/or frequency axis, depending on the modulation.

In embodiments using a TEDS-like multi-carrier scheme in which pilot symbols are provided on several different subcarriers, elimination of the frequency offset terms (using equation 2) is preferably done using pairs of symbols as closely spaced in frequency as possible, in order to minimise the channel attenuation phase difference between the symbols of the pair.

More formally, the above detection steps can be described as the construction by the receiver of the decision variables:

$V_j = \int \Delta_m(p \circ r^*_j)$.

Where $V_j$ is the decision variable derived at the receiver for each possible symbol set j; p is the received symbol sequence (set); $r^*_j$ is the conjugate of the jth reference symbol sequence (set); $\circ$ is the Hadamard (element-wise) product operator; $\Delta_m( )$ is a difference operator, typically operating on pairs of values from the Hadamard product (m signifies that the operator may be specific to a particular multi-carrier modulation system); and the integral, $\int$, is over the values from the symbol sequence (set). The symbol sequences (sets) $r_j$ are designed such that $V_j$ is a maximum when the transmitted sequence (set) is matched to the corresponding sequence (set) at the receiver and integrates to zero for the other sequences (sets), i.e., if $V_j = \int \Delta_m(r_i \circ r^*_j)$, then:

$V_{i=j} = \text{MAX}$, and $V_{i \neq j} = 0$.

The preferred embodiment as described above effectively conveys a single bit of information (i.e. not stealing/stealing). However, the methods of the present invention can be extended to alternatively and/or additionally convey (indicate) other additional information, as desired.

In an embodiment, third and/or fourth and/or fifth (and so on) symbol sequences (sets) are defined and used to convey additional information. The additional information may comprise any such desired information, for example (and in embodiments), the additional information may indicate different modulation levels or types (e.g., 4-QAM, 64-QAM, etc.) for the payload in the slot, different types of coding for the slot contents, different transmission bandwidths, and so on.

In this latter embodiment, a multi-carrier NB-PMR system that normally operates using (e.g.) 12.5 kHz channels and that has the capability to dynamically alter its transmissions to use (e.g.) 25 kHz channels, may indicate such a change to a receiver using the methods of the present invention (e.g. to indicate that additional subcarriers are present in a transmission).

In other embodiments, a dual/multi-purpose equalisation symbol sequence (set) is defined and used as a stealing flag, or for any other purposes as desired, e.g. as a protocol 'escape' flag.

The preferred embodiment described above refers to using sets (sequences) of pilot symbols, and to using all of the pilot symbols available in a burst. However, in other embodiments, any pre-defined subset of pilot symbols may be used. Equally, sequences of synchronisation symbols, or combined sequences of pilot symbols and synchronisation symbols may be used. As will be appreciated, in these embodiments, the transmitter and receiver should both have knowledge of how the sequence of pilot symbols and/or synchronisation symbols is defined.

Figure 7:
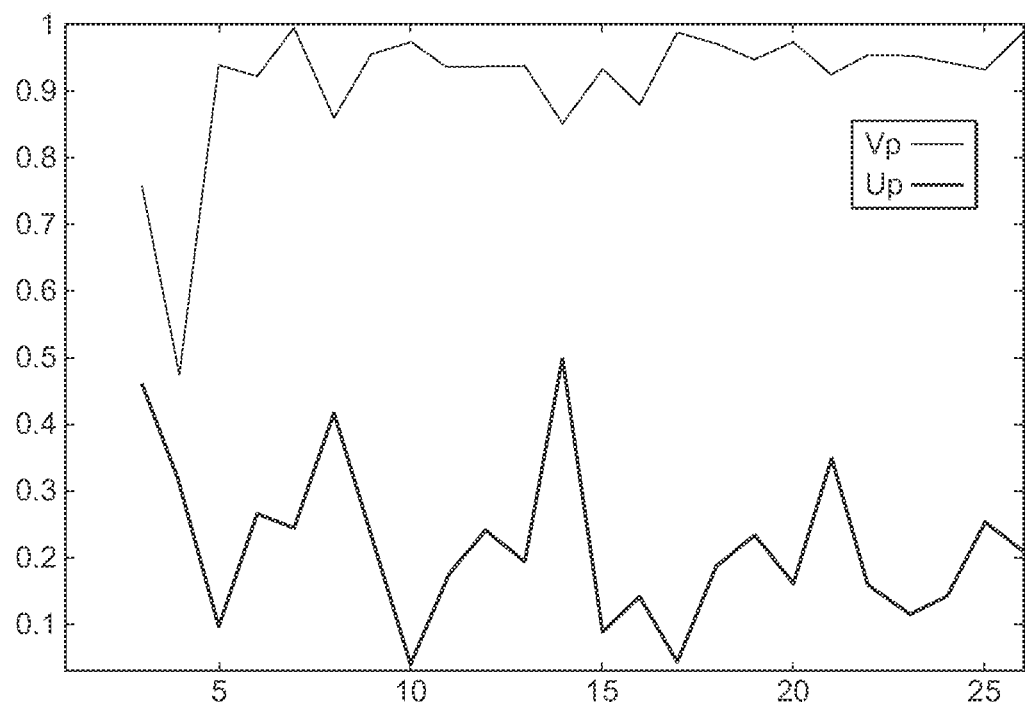
FIG. 7 shows the results of simulations of the (normalised) decision variables using a model of the NB-PMR communication system.

The preferred method of the present invention was simulated using a model of the NB-PMR communication system, and the results are presented in FIG. 7. FIG. 7 shows the (normalised) decision variables $V_p$ and $U_p$ calculated for a static channel having 10 dB signal-to-noise ratio, a frequency offset $f_0=100$ Hz, and a timing offset dt=~58 μs. The values shown in first few frames (0 to 5) are due to simulation start-up delay and can therefore be ignored. As can be seen, $V_p>U_p$, and the correct pilot sequence is therefore detected.

It can be seen from the above, that the present invention, in its preferred embodiments at least, can provide an efficient narrower band mobile communications system. This is achieved in the preferred embodiments of the present invention at least by providing a digital mobile radio communications system that uses particular sequences of pilot symbols and/or synchronisation symbols to indicate to the receiver the presence of stealing.

The invention claimed is:

1. A method of operating a digital mobile radio communications system in which pilot symbols are used for channel equalisation and in which synchronisation symbols are used to indicate burst timings, the method comprising:
   using a sequence of pilot symbols, a sequence of synchronisation symbols, or a sequence of pilot symbols and synchronisation symbols in a transmission to indicate to a receiver the presence of stealing in the transmission;
   including a normal sequence of pilot symbols, synchronisation symbols, or pilot symbols and synchronisation symbols in a transmission when stealing is not present; and
   when stealing is present, including the stealing sequence of pilot symbols, synchronisation symbols, or pilot symbols and synchronisation symbols in the transmission in place of a normal sequence of pilot symbols, synchronisation symbols, or pilot symbols and synchronisation symbols;
   wherein the normal sequence of pilot symbols, synchronisation symbols, or pilot symbols and synchronisation symbols is distinct from the stealing sequence of pilot symbols, synchronisation symbols, or pilot symbols and synchronisation symbols;
   wherein the stealing sequence of pilot symbols, synchronisation symbols, or pilot symbols and synchronisation symbols is arranged to be distinguishable from the normal sequence of pilot symbols, synchronisation symbols, or pilot symbols and synchronisation symbols prior to equalisation.

2. The method of claim 1, wherein the symbol phases of the stealing pilot symbols, synchronisation symbols, or pilot symbols and synchronisation symbols are arranged so that one of: the integral of the pair-wise first order differences of the stealing symbol sequence after referencing with a reference normal symbol sequence, and the integral of the pair-wise first order differences of the stealing symbol sequence after referencing with the reference stealing symbol sequence, will be a minimum, and the other integral will be a maximum.

3. The method of claim 1, wherein the symbol phases of the normal pilot symbols, synchronisation symbols, or pilot symbols and synchronisation symbols are arranged so that one of: the integral of the pair-wise first order differences of the normal symbol sequence after referencing with a reference normal symbol sequence, and the integral of the pair-wise first order differences of the normal symbol sequence after referencing with the reference stealing symbol sequence, will be a maximum, and the other integral will be a minimum.

4. The method of claim 1, wherein the sequence of pilot symbols, synchronisation symbols, or pilot symbols and synchronisation symbols comprises a sequence of pilot symbols, and wherein the pilot symbols are placed at intervals along the time and frequency axes of the transmission.

5. A method of operating a digital mobile radio communications system in which pilot symbols are used for channel equalisation and in which synchronisation symbols are used to indicate burst timings, the method comprising:
   determining whether a received transmission includes a sequence of pilot symbols, a sequence of synchronisation symbols, or a sequence of pilot symbols and synchronisation symbols indicative of the presence of stealing in the transmission; and
   if it is determined that a sequence of pilot symbols, a sequence of synchronisation symbols, or a sequence of pilot symbols and synchronisation symbols indicative of the presence of stealing is present in the received transmission, identifying the presence of stealing in the transmission and decoding the transmission accordingly.

6. The method of claim 5, further comprising:
   determining whether a received transmission includes a normal sequence of pilot symbols, synchronisation symbols, or pilot symbols and synchronisation symbols; and
   if it is determined that a normal sequence of pilot symbols, synchronisation symbols, or pilot symbols and synchronisation symbols is present in the received transmission, decoding the transmission accordingly.

7. The method of claim 6, further comprising determining which of the stealing or normal sequences is present in a received transmission, before carrying out channel equalisation or synchronisation.

8. The method of claim 5, wherein the step of determining whether a received transmission is indicative of the presence of stealing comprises:
    removing reference symbol phases from the received pilot symbols, synchronisation symbols, or pilot symbols and synchronisation symbols for each possible transmitted symbol sequence;
    combining respective symbol pairs to reduce timing or frequency offsets;
    integrating the sets of resulting quantities to form decision variables; and
    comparing the decision variables to determine whether the received transmission includes a sequence of pilot symbols, a sequence of synchronisation symbols, or a sequence of pilot symbols and synchronisation symbols indicative of the presence of stealing, or not.

9. A communications station for a digital mobile radio communications system in which pilot symbols are used for channel equalisation and in which synchronisation symbols are used to indicate burst timings, the communications station comprising:
    a transmitter configured to include in a transmission a sequence of pilot symbols, a sequence of synchronisation symbols, or a sequence of pilot symbols and synchronisation symbols to indicate to a receiver the presence of stealing in the transmission wherein the transmitter is configured to:
        include a normal sequence of pilot symbols, synchronisation symbols, or pilot symbols and synchronisation symbols in a transmission when stealing is not present; and
        when stealing is present, include the stealing sequence of pilot symbols, synchronisation symbols, or pilot symbols and synchronisation symbols in the transmission in place of a normal sequence of pilot symbols, synchronisation symbols, or pilot symbols and synchronisation symbols;
    wherein the normal sequence of pilot symbols, synchronisation symbols, or pilot symbols and synchronisation symbols is distinct from the stealing sequence of pilot symbols, synchronisation symbols, or pilot symbols and synchronisation symbols;
    wherein the stealing sequence of pilot symbols, synchronisation symbols, or pilot symbols and synchronisation symbols is arranged to be distinguishable from the normal sequence of pilot symbols, synchronisation symbols, or pilot symbols and synchronisation symbols prior to equalisation.

10. The station of claim 9, wherein the symbol phases of the stealing pilot symbols, synchronisation symbols, or pilot symbols and synchronisation symbols are arranged so that one of: the integral of the pair-wise first order differences of the stealing symbol sequence after referencing with a reference normal symbol sequence, and the integral of the pair-wise first order differences of the stealing symbol sequence after referencing with the reference stealing symbol sequence, will be a minimum, and the other integral will be a maximum.

11. The station of claim 9, wherein the symbol phases of the normal pilot symbols, synchronisation symbols, or pilot symbols and synchronisation symbols are arranged so that one of: the integral of the pair-wise first order differences of the normal symbol sequence after referencing with a reference normal symbol sequence, and the integral of the pair-wise first order differences of the normal symbol sequence after referencing with the reference stealing symbol sequence, will be a maximum, and the other integral will be a minimum.

12. The station of claim 9, wherein the sequence of pilot symbols, synchronisation symbols, or pilot symbols and synchronisation symbols comprises a sequence of pilot symbols, and wherein the pilot symbols are placed at intervals along the time and frequency axes of the transmission.

13. A digital mobile radio communications system in which pilot symbols are used for channel equalisation and in which synchronisation symbols are used to indicate burst timings, the system comprising:
    a transmitter configured to include in a transmission a sequence of pilot symbols, a sequence of synchronisation symbols, or a sequence of pilot symbols and synchronisation symbols to indicate to a receiver the presence of stealing in the transmission wherein the transmitter is configured to:
        include a normal sequence of pilot symbols, synchronisation symbols, or pilot symbols and synchronisation symbols in a transmission when stealing is not present; and
        when stealing is present, include the stealing sequence of pilot symbols, synchronisation symbols, or pilot symbols and synchronisation symbols in the transmission in place of a normal sequence of pilot symbols, synchronisation symbols, or pilot symbols and synchronisation symbols;
    wherein the normal sequence of pilot symbols, synchronisation symbols, or pilot symbols and synchronisation symbols is distinct from the stealing sequence of pilot symbols, synchronisation symbols, or pilot symbols and synchronisation symbols;
    wherein the stealing sequence of pilot symbols, synchronisation symbols, or pilot symbols and synchronisation symbols is arranged to be distinguishable from the normal sequence of pilot symbols, synchronisation symbols, or pilot symbols and synchronisation symbols prior to equalisation.

14. A communications station for a digital mobile radio communications system in which pilot symbols are used for channel equalisation and in which synchronisation symbols are used to indicate burst timings, the communications station comprising:
    a receiver configured to determine whether a received transmission includes a sequence of pilot symbols, a sequence of synchronisation symbols, or a sequence of pilot symbols and synchronisation symbols indicative of the presence of stealing in the transmission, and to, if it is determined that a sequence of pilot symbols, a sequence of synchronisation symbols, or a sequence of pilot symbols and synchronisation symbols indicative of the presence of stealing is present in the received transmission, identify the presence of stealing in the transmission and decode the transmission accordingly.

15. The station of claim 14, wherein the receiver is configured to:
    determine whether a received transmission includes a normal sequence of pilot symbols, synchronisation symbols, or pilot symbols and synchronisation symbols; and
    if it is determined that a normal sequence of pilot symbols, synchronisation symbols, or pilot symbols and synchronisation symbols is present in the received transmission, decode the transmission accordingly.

16. The station of claim 15, wherein the receiver is configured to determine which of the stealing or normal sequences is present in a received transmission, before carrying out channel equalisation or synchronisation.

17. The station of claim 14, wherein the receiver is configured to determine whether a received transmission is indicative of the presence of stealing by:
  removing reference symbol phases from the received pilot symbols, synchronisation symbols, or pilot symbols and synchronisation symbols for each possible transmitted symbol sequence;
  combining respective symbol pairs to reduce timing or frequency offsets;
  integrating the sets of resulting quantities to form decision variables; and
  comparing the decision variables to determine whether the received transmission includes a sequence of pilot symbols, a sequence of synchronisation symbols, or a sequence of pilot symbols and synchronisation symbols indicative of the presence of stealing, or not.

18. A digital mobile radio communications system in which pilot symbols are used for channel equalisation and in which synchronisation symbols are used to indicate burst timings, the system comprising:
  a receiver configured to determine whether a received transmission includes a sequence of pilot symbols, a sequence of synchronisation symbols, or a sequence of pilot symbols and synchronisation symbols indicative of the presence of stealing in the transmission, and to, if it is determined that a sequence of pilot symbols, a sequence of synchronisation symbols, or a sequence of pilot symbols and synchronisation symbols indicative of the presence of stealing is present in the received transmission, identify the presence of stealing in the transmission and decode the transmission accordingly.

19. A non-transitory computer program element comprising computer software code portions which when the program element is run on a data processor performs a method of operating a digital mobile radio communications system in which pilot symbols are used for channel equalisation and in which synchronisation symbols are used to indicate burst timings, the method comprising:
  using a sequence of pilot symbols, a sequence of synchronisation symbols, or a sequence of pilot symbols and synchronisation symbols in a transmission to indicate to a receiver the presence of stealing in the transmission;
  including a normal sequence of pilot symbols, synchronisation symbols, or pilot symbols and synchronisation symbols in a transmission when stealing is not present; and
  when stealing is present, including the stealing sequence of pilot symbols, synchronisation symbols, or pilot symbols and synchronisation symbols in the transmission in place of a normal sequence of pilot symbols, synchronisation symbols, or pilot symbols and synchronisation symbols;
  wherein the normal sequence of pilot symbols, synchronisation symbols, or pilot symbols and synchronisation symbols is distinct from the stealing sequence of pilot symbols, synchronisation symbols, or pilot symbols and synchronisation symbols;
  wherein the stealing sequence of pilot symbols, synchronisation symbols, or pilot symbols and synchronisation symbols is arranged to be distinguishable from the normal sequence of pilot symbols, synchronisation symbols, or pilot symbols and synchronisation symbols prior to equalisation.

\* \* \* \* \*